3,020,285
N-(CARBANILIDO)-3-OXYPYRIDYL BETAINES

Seymour L. Shapiro, Hastings on Hudson, and Louis Freedman, Bronxville, N.Y., assignors to U.S. Vitamin & Pharmaceutical Corporation, a corporation of Delaware
No Drawing. Filed Apr. 13, 1960, Ser. No. 21,894
6 Claims. (Cl. 260—295)

This invention is concerned with certain novel reaction products of aryl isocyanates and 3-hydroxy pyridine which have been formulated as N-(carbanilido)-3-oxypyridyl betains of the following formula:

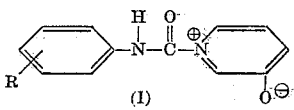

(I)

wherein R is selected from the group consisting of hydrogen, lower alkyl, halo, and lower alkoxy. In addition, the invention includes compounds derived from diisocyanates wherein a single isocyanate group is attached to a phenyl ring, as for example, typical products obtained from 4,4″-diisocyanato-diphenylmethane and 4,4″-diisocyanato-3,3′-bitolyl formulated below:

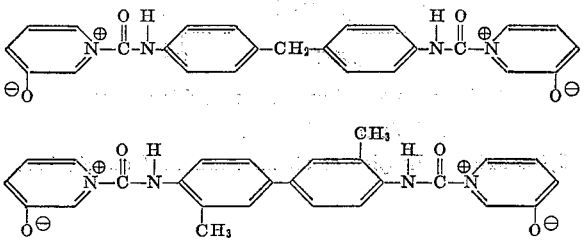

The compounds of this invention are conveniently prepared by reaction of substantially equivalent quantities of the isocyanate and 3-hydroxypyridine at elevated temperatures in a solvent, such as acetonitrile.
The following equation is illustrative:

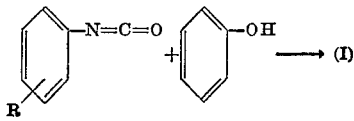

Alternatively, the reactants may be heated together in the absence of a solvent and the product recovered by recrystallization.

The betaine structural assignment has been made on the basis of the strong ferric chloride reaction (orange color) indicating retention of the phenolic-like oxygen in the 3-position of the pyridine ring.

It is of interest that similar reactions of 3-hydroxypyridine with naphthyl isocyanate, phenyl isothiocyanate, or alkyl isocyanates such as butyl isocyanate failed to give compounds of the type described above.

The compounds of this application are stable, crystalline, white solids with no odor, and indeed, this property reflects one of the important utilities of the compounds. It is well known in the art that aryl isocyanates are relatively unstable materials, and in addition, are powerful lachrymators. We have found that with the compounds of this application under suitable conditions the noted reaction equation is reversed and affords the isocyanate and 3-hydroxypyridine.

Thus, on boiling with ethanol, the phenyl urethane is isolated, as for example, phenylurethane, from (I), R=H.

The compounds of this invention, therefore, provide a suitable means of forming aryl isocyanates in situ for reactions such as preparation of phenylurethane derivatives.

In addition, the compounds herein described show pharmacological activity as potentiators of adrenalin, central nervous system depressants and anti-inflammatory agents.

The process and compounds of this invention will be more clearly understood from a consideration of the following specific examples which are given for the purpose of illustration only and are not to be construed as limiting the scope of the invention in any way.

EXAMPLE 1

A mixture of 3.9 g. (0.03 mole) of m-tolylisocyanate and 2.8 g. (0.03 mole) of 3-hydroxypyridine was heated in an oil bath, maintained at 195° for 0.5 hour. When cool, the reaction product was dissolved in 35 ml. of acetonitrile and after standing 24 hours 3.53 g. of product, M.P. 120–121°, was obtained.

The compounds described in the table below were obtained in a similar manner.

Table

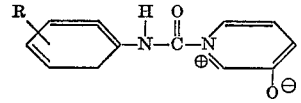

| No. | R | M.P., °C.[a,b] | Percent Yield[c] | Formula | Analyses,[d] Percent | | | | | |
|---|---|---|---|---|---|---|---|---|---|---|
| | | | | | Carbon | | Hydrogen | | Nitrogen | |
| | | | | | Calcd. | Fd. | Calcd. | Fd. | Calcd. | Fd. |
| 1 | H | 135–136 | 48 | $C_{12}H_{10}N_2O_2$ | 67.3 | 67.7 | 4.7 | 4.6 | 13.1 | 12.7 |
| 2 | o-CH₃— | 81–84 | 52 | $C_{13}H_{12}N_2O_2$ | 68.1 | 68.1 | 5.7 | 5.4 | 12.2 | 12.0 |
| 3 | m-CH₃— | 120–121 | 51 | $C_{13}H_{12}N_2O_2$ | 68.1 | 68.4 | 5.7 | 5.2 | 12.2 | 12.1 |
| 4 | p-CH₃— | 153–155 | 51 | $C_{13}H_{12}N_2O_2$ | 68.1 | 68.3 | 5.7 | 5.2 | 12.2 | 11.7 |
| 5 | o-Cl | 103–104 | 54 | $C_{12}H_9ClN_2O_2$ | 58.0 | 58.2 | 3.7 | 3.8 | 11.3 | 10.9 |
| 6 | m-Cl | 159–160 | 56 | $C_{12}H_9ClN_2O_2$ | 58.0 | 58.2 | 3.7 | 3.7 | 11.3 | 11.1 |
| 7 | p-Cl | 196–197 | 56 | $C_{12}H_9ClN_2O_2$ | 58.0 | 57.5 | 3.7 | 3.8 | 11.3 | 10.8 |
| 8 | p-Br | 203–208 | 62 | $C_{12}H_9BrN_2O_2$ | | | | | 9.6 | 9.6 |
| 9 | o-CH₃O— | 83–84 | 37 | $C_{13}H_{12}N_2O_3$ | 63.9 | 63.4 | 5.0 | 5.1 | 11.5 | 11.2 |
| 10 | p-CH₃O— | 134–135 | 55 | $C_{13}H_{12}N_2O_3$ | 63.9 | 64.0 | 5.0 | 4.8 | 11.5 | 11.2 |
| 11 | (e) | 155–157 | 73 | $C_{25}H_{20}N_4O_4$ | 68.2 | 67.3 | 4.6 | 5.1 | 12.7 | 13.2 |
| 12 | (f) | 128–132 | 44 | $C_{26}H_{22}N_4O_4$ | 68.7 | 68.5 | 4.9 | 4.9 | 12.3 | 12.3 |

[a] Melting points are not corrected.
[b] Recrystallizing solvent was acetonitrile in all cases.
[c] Yields are given for recrystallized product.
[d] Analyses by Weiler and Strauss, Oxford, England.
[e] Bis-betaine from 4,4′-diisocyanato-diphenylmethane.
[f] Bis-betaine from 4,4′-diisocyanato-3,3′-bitolyl.

EXAMPLE 2

One g. of N-(carbanilido)-3-oxypyridyl betaine (table, compound 1) was boiled with 20 ml. of ethanol and the reaction mixture concentrated to 5 ml., and 5 ml. of water and 1.7 ml. of 3 N hydrochloric acid added. The formed precipitate was separated and recrystallized from hexane. The product so isolated melted 49–50° and did not depress the melting point of authentic N-phenylurethane, mixed M.P. 49–50°.

For therapeutic purposes the compounds of this invention are formulated to contain 50–150 mg. of active ingredient in a pharmaceutical extender which does not coact with the active principles described herein.

It is to be understood that it is intended to cover all changes and modifications of the example herein chosen for the purposes of illustration which do not constitute departure from the spirit and scope of the invention.

We claim:

1. A member of the group consisting of compounds of the following formulae

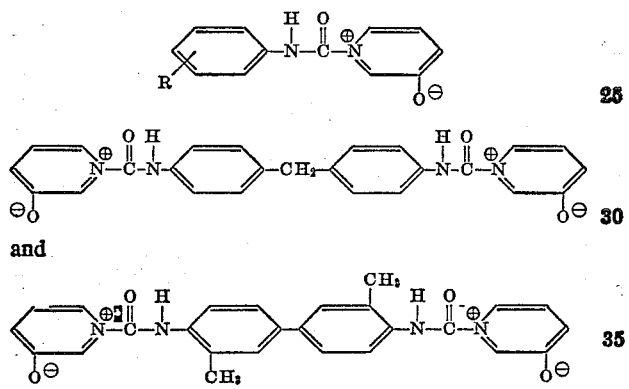

and wherein R is selected from the group consisting of hydrogen, lower alkyl, halogen, and lower alkoxy.

2. The compound

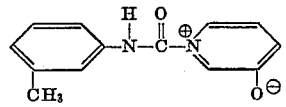

3. The compound

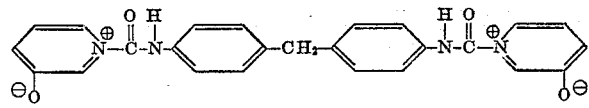

4. The compound

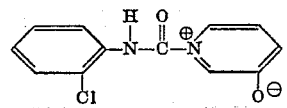

5. The compound

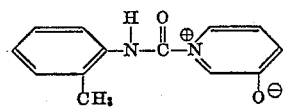

6. The compound

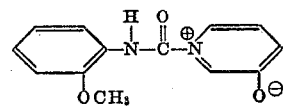

References Cited in the file of this patent

UNITED STATES PATENTS 2,909,528   Shapiro et al. _____ Oct. 20, 1959